US012769136B1

(12) United States Patent
Jaseem

(10) Patent No.: US 12,769,136 B1
(45) Date of Patent: Oct. 20, 2026

(54) HEAD-MOUNTED PROJECTION AND INTERACTIVE DISPLAY APPARATUS

(71) Applicant: Muhammad Jaseem, Houston, TX (US)

(72) Inventor: Muhammad Jaseem, Houston, TX (US)

( * ) Notice: Subject to any disclaimer, the term of this patent is extended or adjusted under 35 U.S.C. 154(b) by 0 days.

(21) Appl. No.: 19/316,272

(22) Filed: Sep. 2, 2025

(51) Int. Cl.
*G02B 27/01* (2006.01)
*G06F 1/16* (2006.01)
*G06F 3/01* (2006.01)

(52) U.S. Cl.
CPC ..... *G02B 27/0172* (2013.01); *G02B 27/0176* (2013.01); *G06F 1/1605* (2013.01); *G06F 3/014* (2013.01); *G06F 3/017* (2013.01); *G02B 2027/0138* (2013.01)

(58) Field of Classification Search
CPC ............ G02B 27/0172; G02B 27/0176; G02B 2027/0138; G06F 1/1605; G06F 3/014; G06F 3/017; G06F 3/012
USPC .............................................................. 345/8
See application file for complete search history.

(56) References Cited

U.S. PATENT DOCUMENTS

2014/0043214 A1* 2/2014 Park ........................ G06F 3/011 345/8
2016/0246369 A1* 8/2016 Osman .................. A63F 13/212
2017/0168566 A1* 6/2017 Osterhout ............ G02B 27/017
2025/0138319 A1* 5/2025 Chen ................... B63C 11/2209

* cited by examiner

*Primary Examiner* — Nathan P Brittingham

(57) ABSTRACT

A head-mounted optical projection and interactive display apparatus is disclosed. The apparatus includes a projection module with a stabilizing motor to maintain image stability relative to space, an electronic control unit with wireless communication, SIM telephony, GPS, and AI-based processing, a camera configured for gesture recognition, object detection, and positional memory storage, and a motorized ear-locking mechanism. The system projects interactive overlays onto surfaces or an optical combiner, highlights real-world objects, recalls stored object locations, and provides navigation cues. An auxiliary glove-mounted input device transmits gyroscopic and button-based control signals. The apparatus further supports hands-free telephony, audio playback, and multimodal interaction between projected content and environmental recognition.

20 Claims, 10 Drawing Sheets

REFERENCE NUMERALS LIST

100 – Human head (environmental illustration, not part of claimed apparatus)
101 – Main housing assembly
102 – Adjustable mounting arm / support frame
103 – Projection module assembly (optical lens, image engine, hinge)
104 – Button casing / control housing
105 – Electronic control board (e.g., single-board computer)
106 – Cellular / wireless communication module (4G/5G, data, voice)
107 – Integrated cooling system
108 – Integrated camera module
109 – Left-side ear lock mechanical arm
110 – Right-side ear lock mechanical arm
111 – Battery power supply
112 – Speaker wall with ear openings (also functions as headphone/earphone)
113 – Locking mechanism hinge/pivot assembly
114 – Mounting hinge for projection module
115 – Protective lens cover (optional)
116 – Cable and wiring harness assembly
117 – Structural reinforcement bracket
118 – Cooling fan
119 – Projection lens output (viewable image area)
120 – Camera housing
121 – Left ear-lock actuator motor
122 – Right ear-lock actuator motor
123 – Power/Ear lock control button
124 – Volume up button
125 – Volume down button
126 – Mode selection button
127 – Hand (gesture detection illustration)
128 – Table or flat surface
129 – First object (e.g., keys)
130 – Second object (e.g., apple)
131 – Projected light
132 – Casing for glove mouse
133 – Main board and battery for glove mouse
134 – Gyroscope/motion sensor (e.g., MPU6050)
135 – Left-click button
136 – Right-click button
137 – Phone symbol on projected screen
138 – Wi-Fi symbol on projected screen

FIG. 10

HEAD-MOUNTED PROJECTION AND INTERACTIVE DISPLAY APPARATUS

FIELD OF THE INVENTION

The present invention relates generally to wearable electronic display systems, and more particularly to a head-mounted projection and interactive display apparatus integrating projection, gesture recognition, wireless communication, and artificial intelligence features.

BACKGROUND OF THE INVENTION

Wearable display systems such as augmented reality glasses and head-mounted displays are increasingly used to provide users with interactive digital content in real-world environments. Existing systems often suffer from limited projection stability, restricted interaction modalities, and inadequate integration of communication and object-recognition features. Accordingly, there exists a need for a head-mounted projection apparatus that offers a stable projection experience, intuitive gesture and glove-based interaction, and AI-powered environmental recognition.

SUMMARY OF THE INVENTION

The invention provides an integrated head-mounted projection and interactive display apparatus configured to project digital content either onto external surfaces or an optical combiner for augmented reality viewing. The apparatus includes a projection module assembly, motorized ear-locking arms for secure fit, a cooling system, a communication module supporting cellular and wireless connectivity, and AI-enabled camera systems capable of recognizing objects and tracking environmental context. The system further supports gesture-based input and glove-based auxiliary control, enabling natural multimodal interaction. A stabilizing motor ensures projected images remain fixed in space, even as the user moves their head.

BRIEF DESCRIPTION OF THE DRAWINGS

FIG. 10 provides a reference list of the numerals used in the figures.

DETAILED DESCRIPTION OF THE INVENTION

Figure 1:
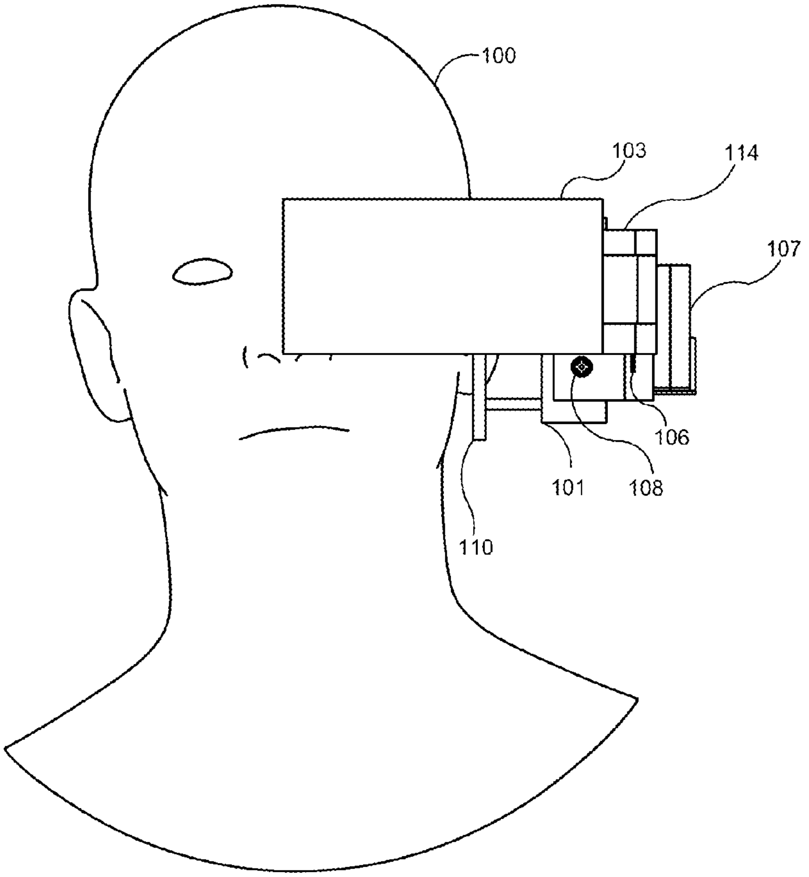
FIG. 1 is an environmental view illustrating the apparatus worn on a user's head, showing the main housing and projection module.
Figure 2:
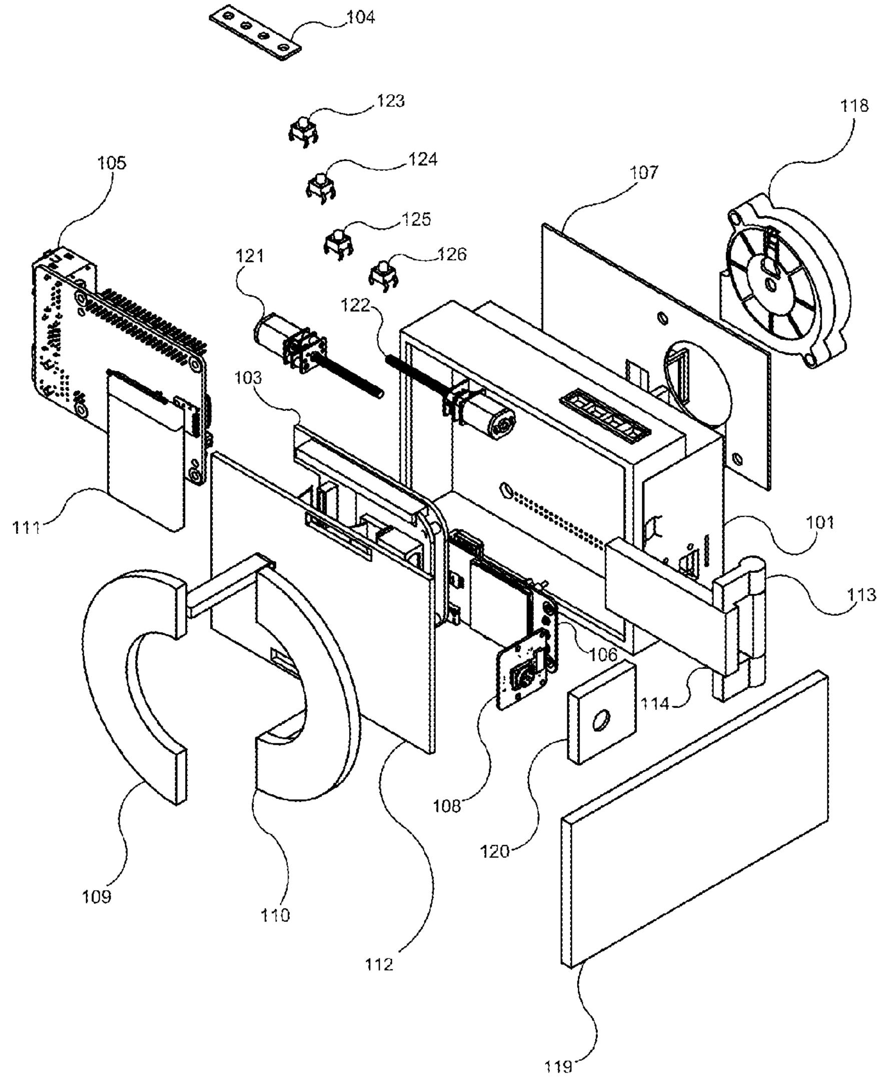
FIG. 2 is a perspective view of the housing assembly with the motorized ear-lock arms and mounting structure.
Figure 3:
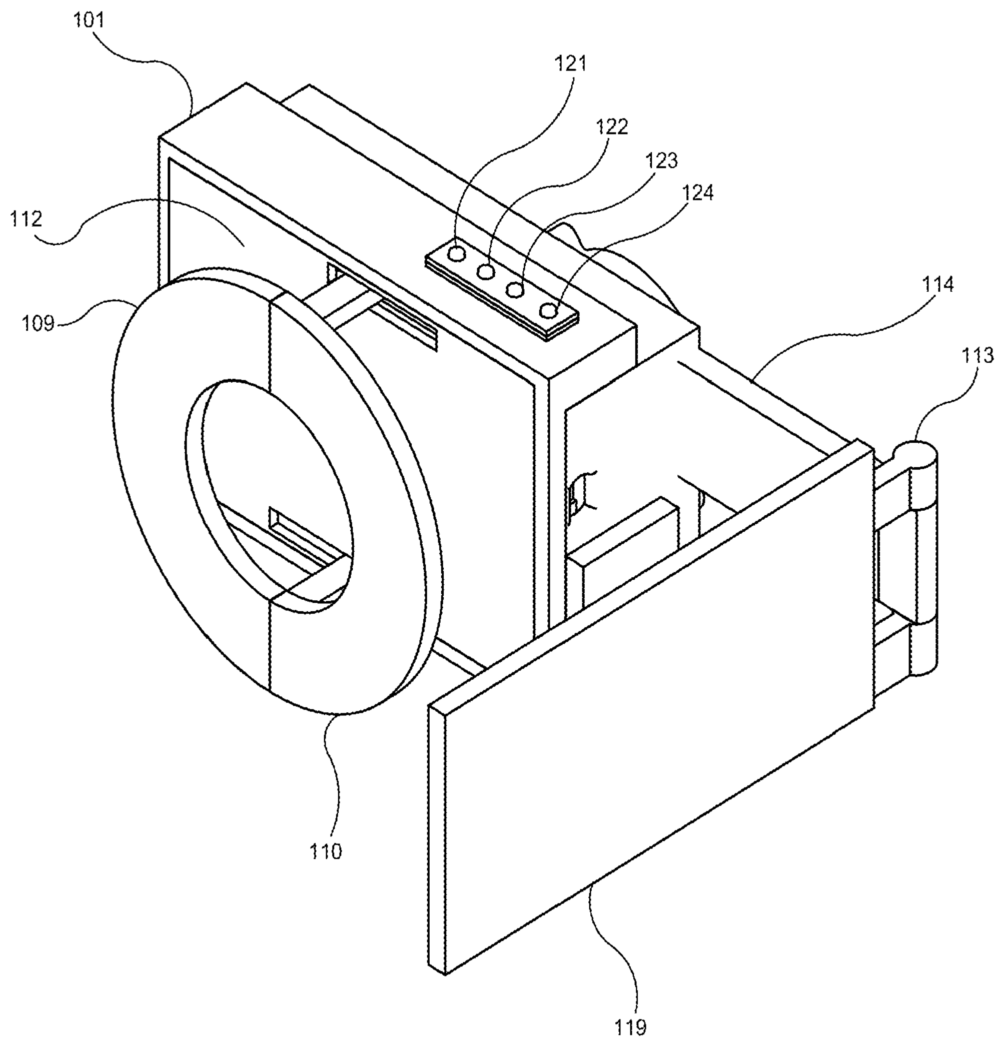
FIG. 3 is a front view showing the projection lens, camera module, user buttons, and ear-lock mechanism, with a hand depicted to illustrate gesture detection.
Figure 4:
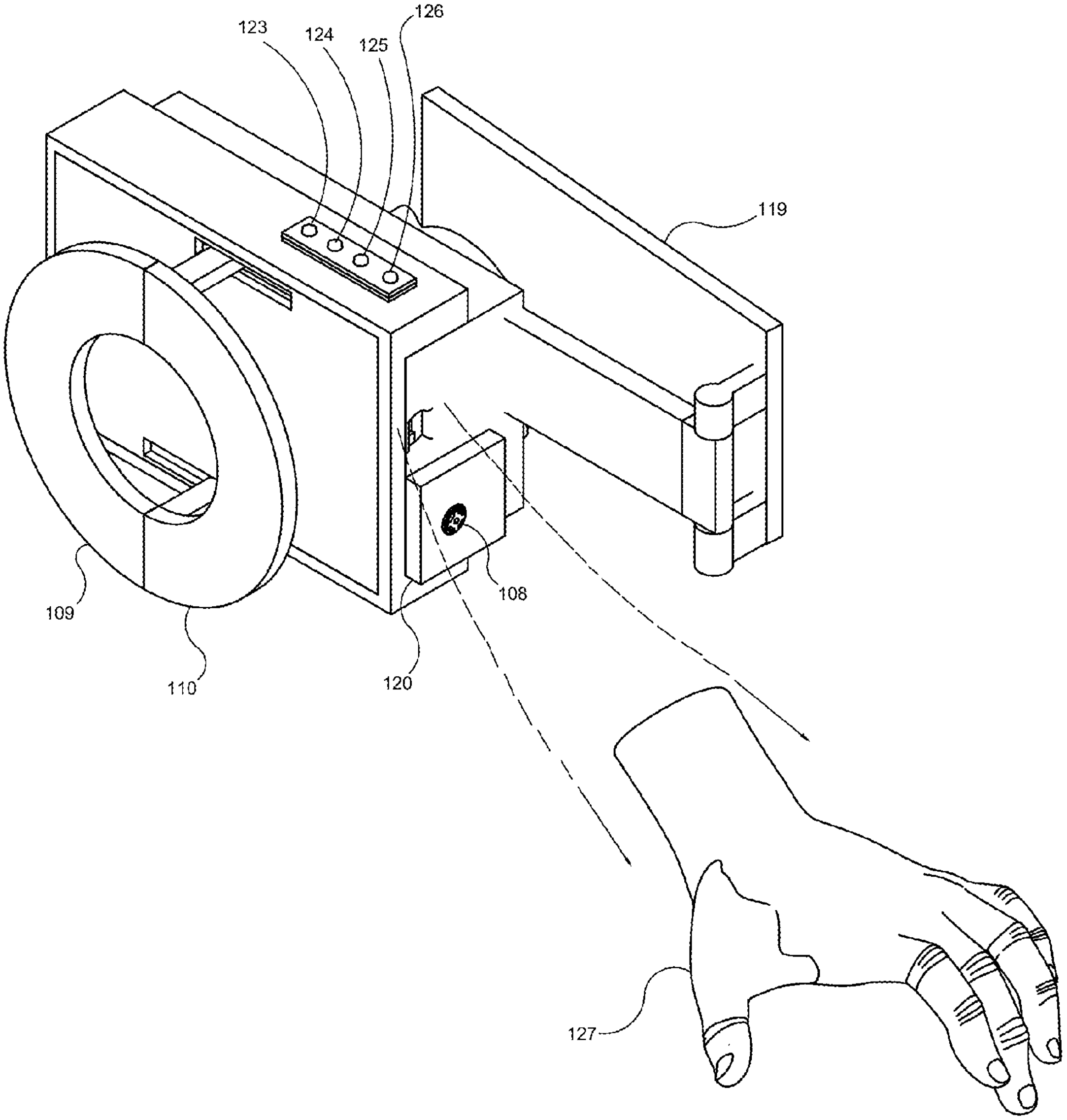
FIG. 4 is a side/environmental view illustrating projection toward a table surface with real-world objects (e.g., keys and an apple) and a projected light beam.
Figure 5:
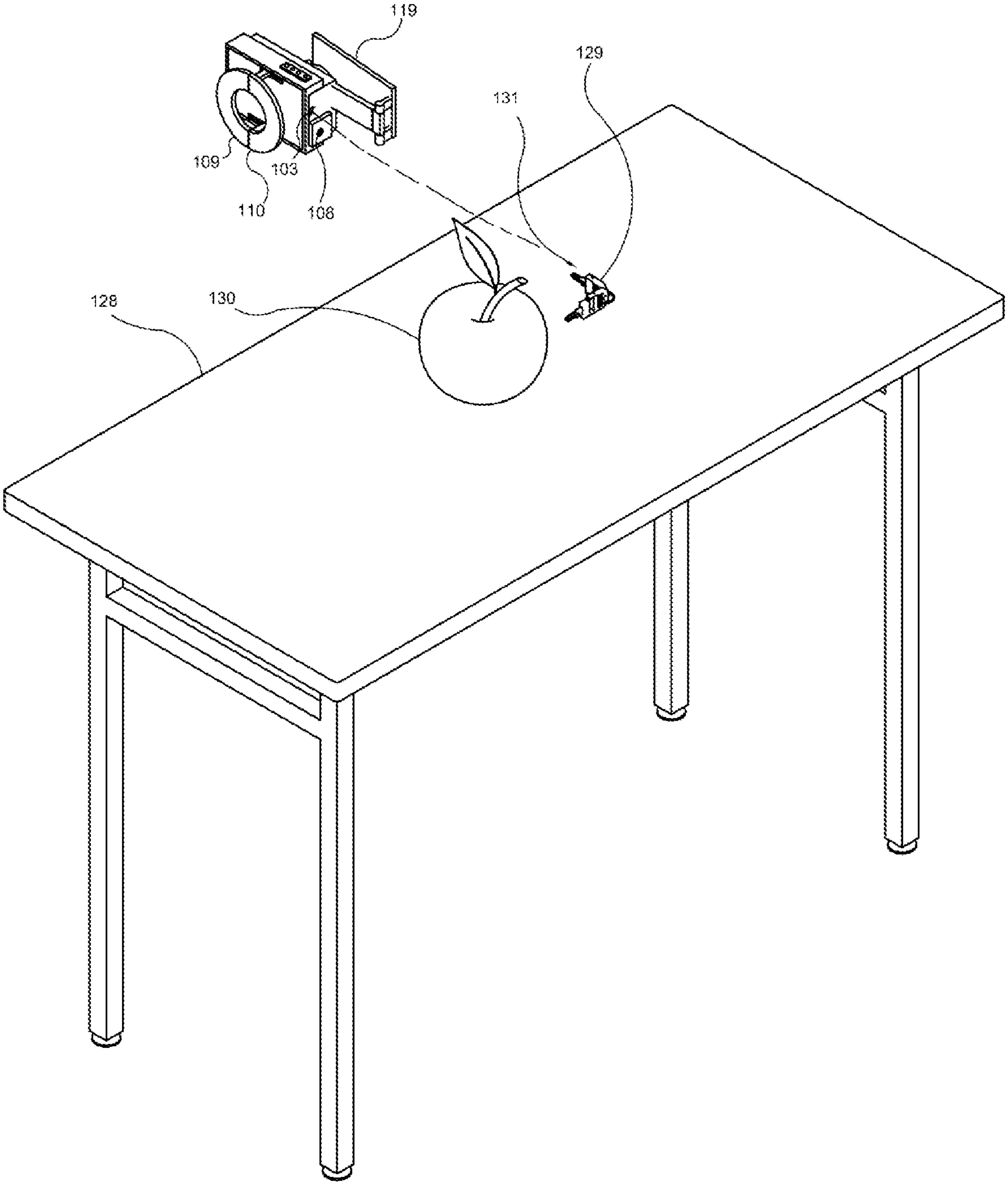
FIG. 5 illustrates object recognition and surface projection in the table scenario, highlighting target objects within the projected region.
Figure 6:
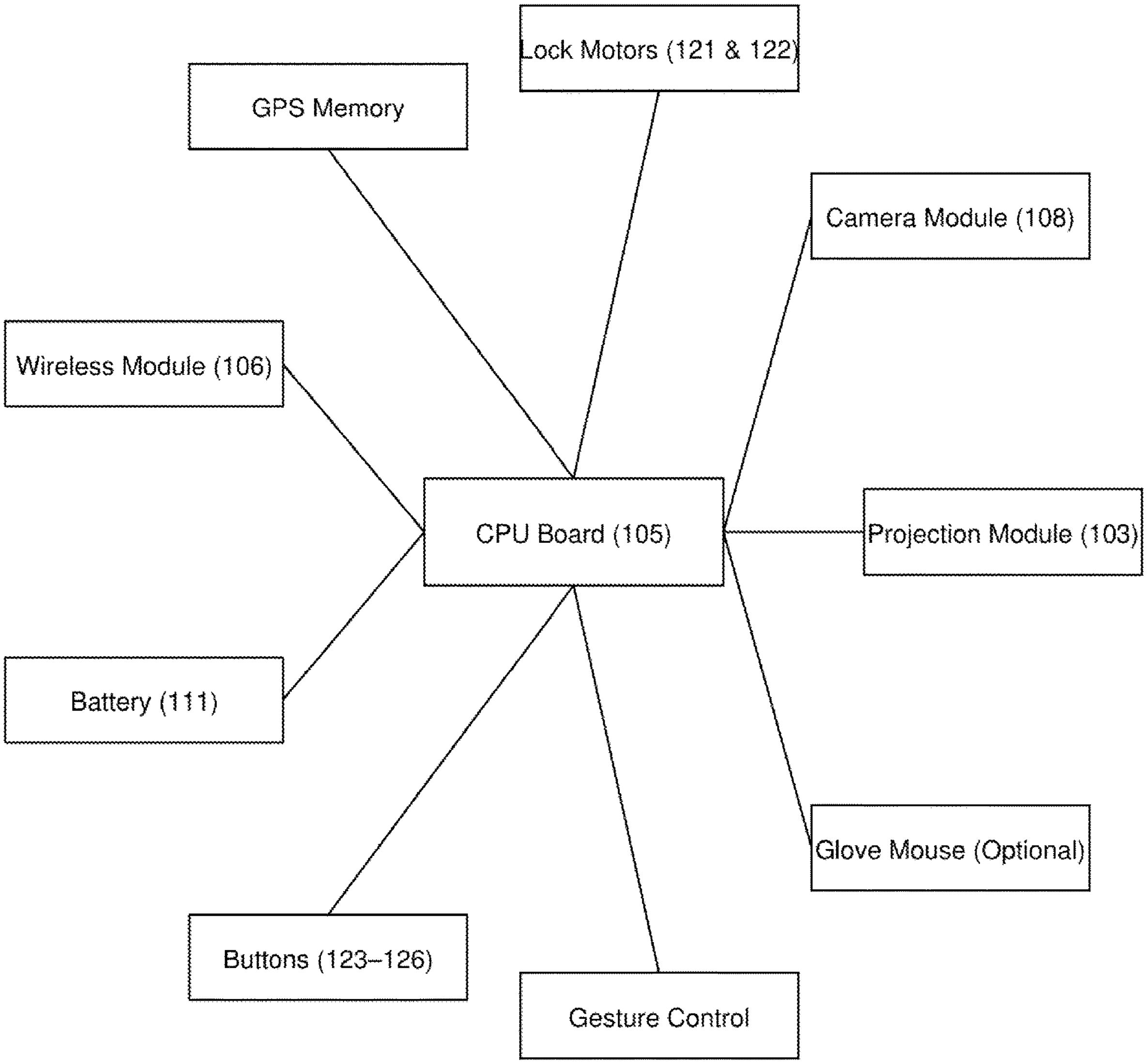
FIG. 6 is a block diagram of the system architecture, including the CPU/electronic control board, projection module, camera, lock motors, communication module, battery, user buttons, and optional glove mouse.
Figure 7:
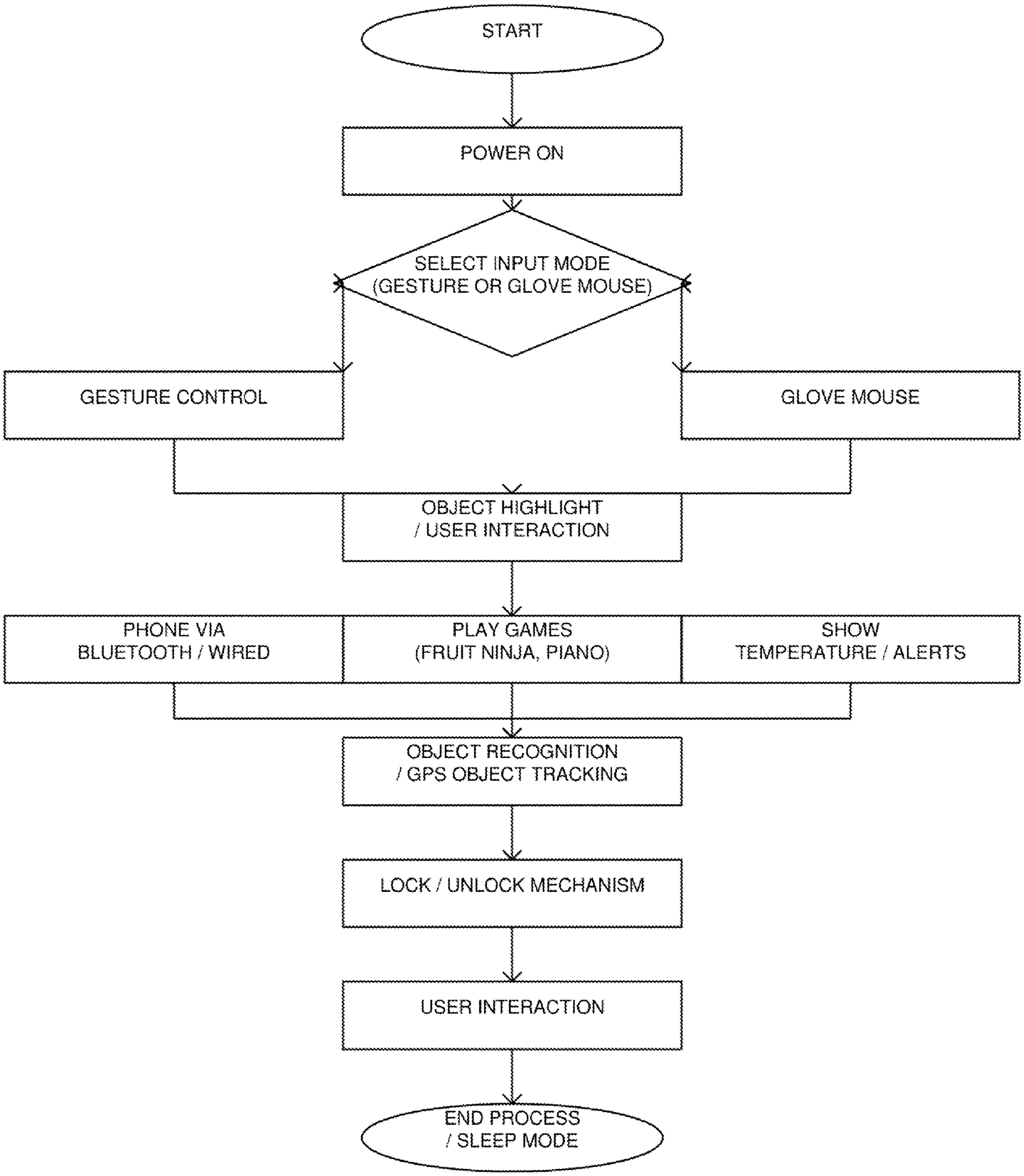
FIG. 7 is a flowchart showing system operation, including power-on, input selection (gesture or glove mouse), user interaction, object recognition, GPS/object tracking, and lock/unlock functions.
Figure 8:
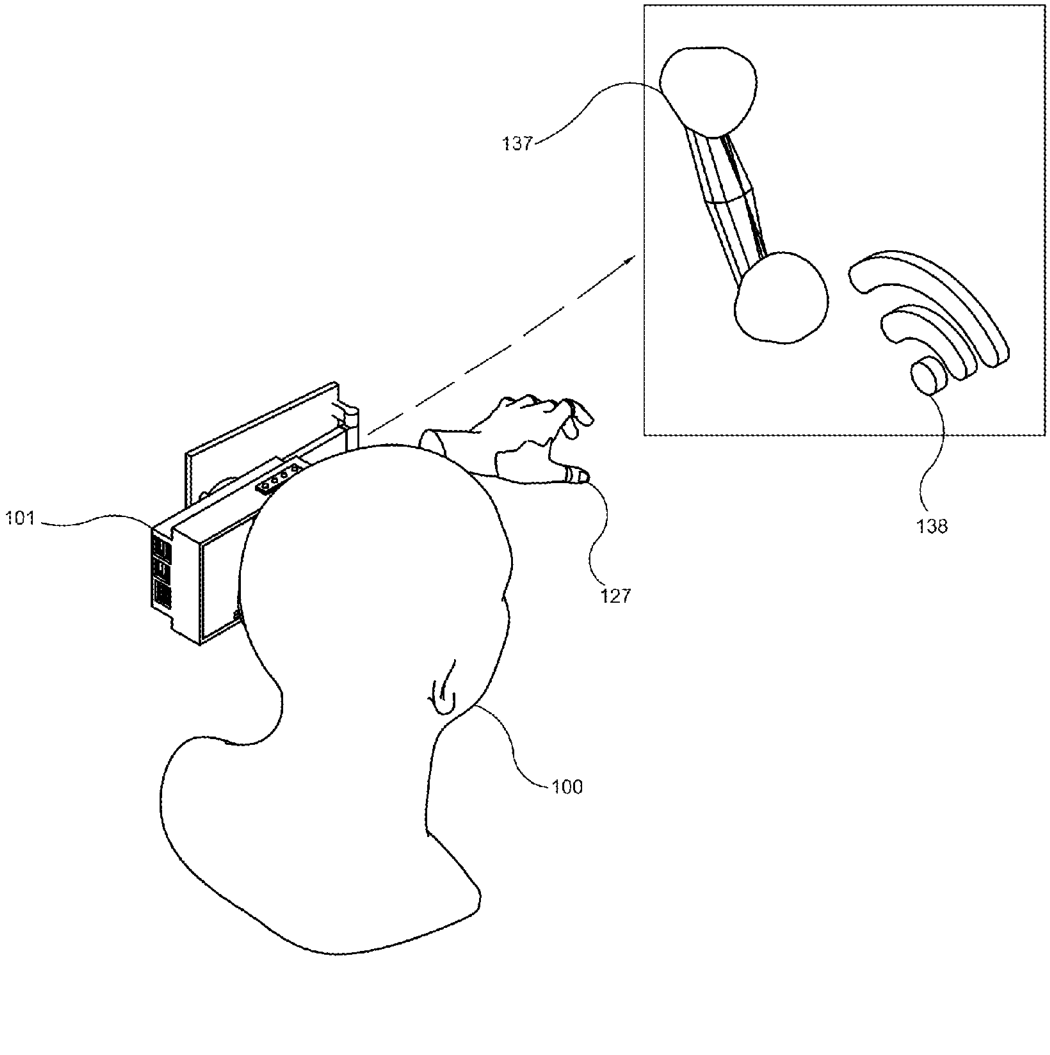
FIG. 8 illustrates the projected interactive display with icons such as a phone symbol and a Wi-Fi symbol.
Figure 9:
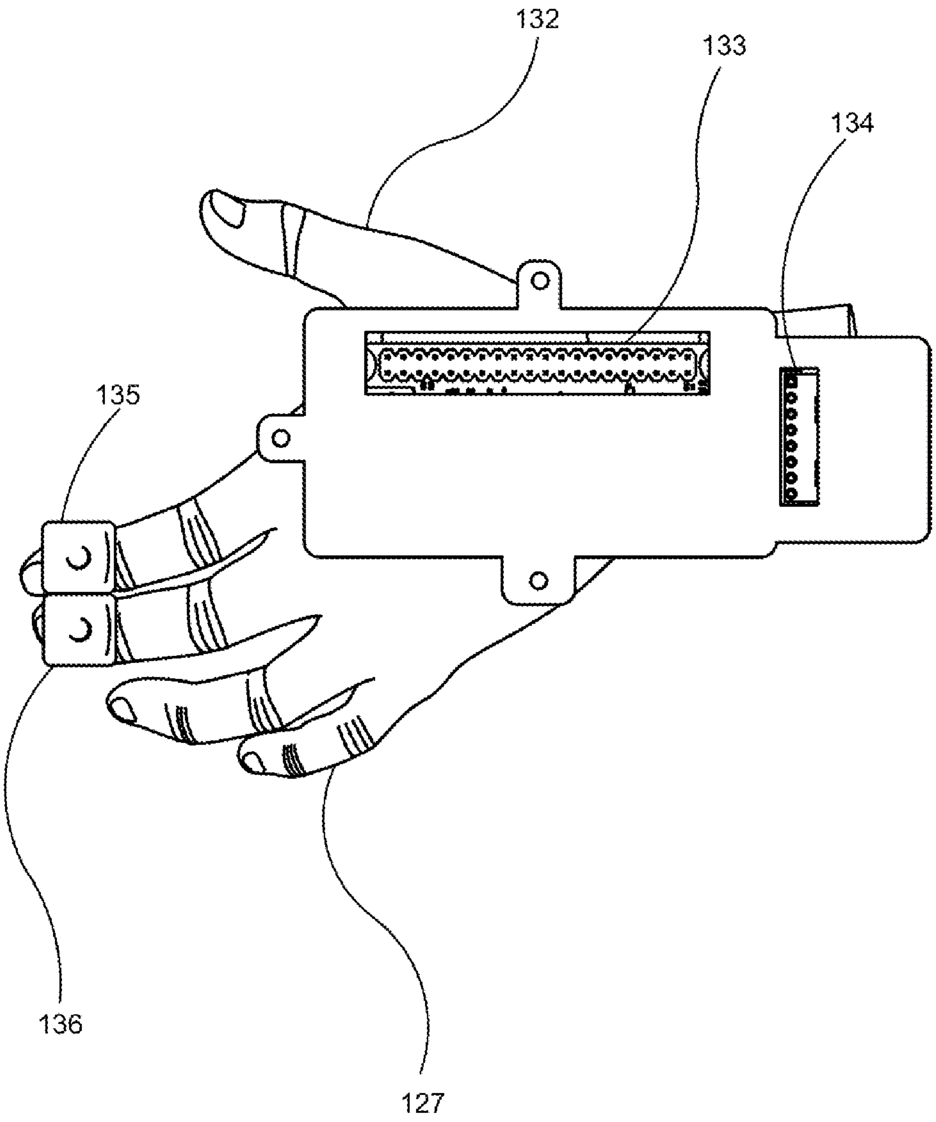
FIG. 9 shows the glove-mounted input device, including casing, main board and battery, gyroscopic/motion sensor, and input buttons.

Referring to the drawings, the integrated head-mounted projection and interactive display apparatus comprises a main housing assembly (101) configured to be worn on a user's head (100). The housing supports a projection module assembly (103) comprising an optical lens and image engine. The projection module is mounted via a hinge (114) to allow selectable movement between a surface-projection orientation and a front-facing orientation suitable for augmented reality viewing.

The electronic control board (105) is operatively coupled to a communication module (106), a power supply (111), and a cooling system (107, 118). The communication module supports cellular connectivity, including 4G/5G, Wi-Fi, and Bluetooth. The cooling system includes an integrated fan (118) and vent structures for heat dissipation.

The apparatus further includes a camera module (108, 120) configured to capture environmental images, recognize objects such as keys or fruit, and enable gesture-based interaction. Artificial intelligence integrated within the control system processes the captured images to provide contextual overlays, including highlighting specific objects when queried by the user. For example, the system may project a highlight on an apple in response to a verbal query.

The projection system is further stabilized by a motorized mechanism that maintains the projected image fixed relative to the environment, even as the user moves their head up or down. This provides a stable, intuitive user experience.

A motorized ear-locking mechanism includes left and right arms (109, 110), pivotally mounted via hinges (113) and driven by actuator motors (121, 122). These arms secure the apparatus to the user's head for comfortable and reliable use.

One or more user input buttons (123-126) are disposed on the housing, enabling direct control of projection functions. In addition, an auxiliary glove-based control system (132-136) is provided. The glove casing (132) contains a main control board (133), a gyroscopic sensor (134), and dedicated input buttons (135, 136). The glove communicates wirelessly with the apparatus to provide pointer control and gesture input.

The projected display can include user interface icons such as a phone symbol (137) for call notifications and a Wi-Fi symbol (138) for connectivity status. Object-recognition overlays (129, 130) can be projected onto real-world surfaces, allowing the user to interact with their environment in an enhanced manner.

What is claimed is:

1. An integrated head-mounted projection and interactive display apparatus, comprising: a main housing configured to be worn on a user's head; a projection module assembly comprising an optical lens and an image engine and being movably mounted via a hinge between (i) a surface-projection orientation in which the apparatus projects onto an external surface and (ii) a front-facing augmented-reality orientation; a mounting structure supporting adjustment of the projection module assembly relative to the housing; an electronic control board including a processor operatively coupled to a wireless communication module, a battery power supply, and a cooling system; a camera module configured to capture environmental imagery for computer-implemented object recognition and gesture detection; a motorized image-stabilizing mechanism operatively coupled to the projection module assembly and configured to maintain a projected image fixed in space relative to a target region in the environment during movement of the housing; a motorized ear-locking mechanism comprising left and right lock arms driven by actuator motors via hinges; one or more user input buttons; and an auxiliary glove-mounted control unit comprising a casing, a motion sensor, and one or more input buttons, the glove-mounted control unit being configured to wirelessly transmit pointer control and selection signals to the processor.

2. The apparatus of claim 1, wherein the projection module assembly further comprises a protective lens cover.

3. The apparatus of claim 1, wherein the mounting structure provides at least one of rotational and translational adjustment of the projection module assembly relative to the housing.

4. The apparatus of claim 1, wherein the wireless communication module supports cellular data service and short-range wireless connectivity comprising at least Wi-Fi and Bluetooth.

5. The apparatus of claim 1, further comprising an integrated speaker aligned with a user's ears.

6. The apparatus of claim 1, wherein the cooling system includes an integrated fan and vent structure for heat dissipation.

7. The apparatus of claim 1, further comprising a structural reinforcement bracket configured to stabilize the housing under load.

8. The apparatus of claim 1, wherein an output of the projection module assembly projects an interactive display onto at least one of a table surface, a wall, and an optical combiner.

9. The apparatus of claim 1, wherein the glove-mounted control unit comprises a casing containing a main control board, a battery, and a gyroscopic motion sensor.

10. The apparatus of claim 9, wherein the glove-mounted control unit further comprises dedicated input buttons including a left-click button and a right-click button.

11. The apparatus of claim 9, wherein the gyroscopic motion sensor enables pointer control by detecting hand movement in free space.

12. The apparatus of claim 1, wherein gesture inputs from the glove-mounted control unit are combined with camera-based gesture detection by the processor to provide multi-modal interaction with the projected display.

13. The apparatus of claim 1, wherein the projected display includes virtual user-interface elements comprising at least a phone symbol and a Wi-Fi symbol.

14. The apparatus of claim 1, wherein the processor is configured to cause projection of object-recognition overlays that highlight detected real-world objects within a projection region.

15. The apparatus of claim 1, wherein detected hand gestures enable mouse-pointer control on the projected image.

16. The apparatus of claim 1, wherein the processor is configured, responsive to a user request, to identify a specified real-world object within imagery captured by the camera.

17. The apparatus of claim 1, wherein the processor is further configured to store a location of a physical item and, responsive to a subsequent user request, to project a visual indicator that guides the user to the stored location.

18. The apparatus of claim 1, wherein the motorized image-stabilizing mechanism comprises a stabilizing motor operable to actuate the projection module assembly to maintain the projected image fixed relative to the environment despite movement of the user's head.

19. The apparatus of claim 1, further comprising a subscriber identity module interface configured to enable cellular voice calling via the wireless communication module.

20. The apparatus of claim 1, further comprising a microphone and speaker system configured to provide voice input and audio output for telephone calls and voice-based interaction with the processor.

* * * * *